United States Patent
Kanzler et al.

(10) Patent No.: US 11,912,306 B2
(45) Date of Patent: Feb. 27, 2024

(54) LOW IMPACT DETECTION FOR AUTOMATED DRIVING VEHICLES

(71) Applicant: ZF FRIEDRICHSHAFEN AG, Friedrichshafen (DE)

(72) Inventors: Steven Kanzler, Rochester Hills, MI (US); Kiran Balasubramanian, Canton, MI (US); Carl Munch, Troy, MI (US); Andreas Fleckner, Mülhausen-Ehingen (DE); Harald Pfriender, Constance (DE); Michal Duchowski, Częstochowa (PL); Charles Bartlett, Commerce Township, MI (US); Huahn-Fern Yeh, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 110 days.

(21) Appl. No.: 17/438,537

(22) PCT Filed: Mar. 20, 2020

(86) PCT No.: PCT/IB2020/052605
§ 371 (c)(1),
(2) Date: Sep. 13, 2021

(87) PCT Pub. No.: WO2020/208446
PCT Pub. Date: Oct. 15, 2020

(65) Prior Publication Data
US 2022/0153304 A1    May 19, 2022

Related U.S. Application Data

(60) Provisional application No. 62/830,877, filed on Apr. 8, 2019.

(51) Int. Cl.
*B60W 60/00* (2020.01)
*B60W 30/095* (2012.01)
*B60W 40/114* (2012.01)

(52) U.S. Cl.
CPC ...... *B60W 60/0017* (2020.02); *B60W 30/095* (2013.01); *B60W 40/114* (2013.01); *B60W 2554/4029* (2020.02)

(58) Field of Classification Search
CPC ............ B60W 30/095; B60W 40/114; B60W 60/0017; B60W 2554/4029
See application file for complete search history.

(56) References Cited

U.S. PATENT DOCUMENTS

| | | | |
|---|---|---|---|
| 7,565,242 B2* | 7/2009 | Lucas | B60T 7/22 |
| | | | 701/96 |
| 8,985,652 B1* | 3/2015 | Switkes | B60R 19/20 |
| | | | 293/136 |

(Continued)

FOREIGN PATENT DOCUMENTS

| | | | | |
|---|---|---|---|---|
| GB | 2282891 A | * | 4/1995 | ............ G01P 15/123 |
| GB | 2431623 A | * | 5/2007 | ............ B60R 19/483 |
| WO | WO-2020089410 A1 | * | 5/2020 | ............ B60R 21/01 |

OTHER PUBLICATIONS

U.S. Appl. No. 62/754,299, filed Nov. 1, 2018. (Year: 2018).*

(Continued)

*Primary Examiner* — Calvin Cheung
(74) *Attorney, Agent, or Firm* — TAROLLI, SUNDHEIM, COVELL & TUMMINO L.L.P.

(57) ABSTRACT

A method helps to protect an occupant of a vehicle (10) equipped with an automated driving system (200) and a vehicle safety system (100) by detecting low impact crash events (99) with the vehicle (10). The method includes utilizing automated driving sensors (220, 230, 240, 250, 260) of the automated driving system (200) to identify (Continued)

possible low impact collision risks. The method also includes utilizing vehicle safety system sensors (110, 115, 120, 125, 130) of the vehicle safety system to determine a low impact collision resulting from the identified possible low impact collision. A vehicle safety system (100) includes an airbag controller unit (150) configured to implement the method to determine low impact crash events with the vehicle (10).

21 Claims, 5 Drawing Sheets

(56) References Cited

U.S. PATENT DOCUMENTS

| | | |
|---|---|---|
| 2004/0036261 A1 | 2/2004 | Breed |
| 2006/0052924 A1 | 3/2006 | Prakah-Asante et al. |
| 2007/0100527 A1 | 5/2007 | Rao et al. |
| 2007/0182528 A1* | 8/2007 | Breed ............... B60W 30/16 348/148 |
| 2008/0201042 A1 | 8/2008 | Cuddihy et al. |
| 2009/0299576 A1* | 12/2009 | Baumann .......... B60R 21/0134 701/45 |
| 2014/0052341 A1* | 2/2014 | Leach ............... G01L 19/0092 701/45 |
| 2014/0163824 A1* | 6/2014 | Kim ................. B60R 21/0136 701/45 |
| 2015/0166059 A1* | 6/2015 | Ko .................... B60T 7/22 701/28 |

OTHER PUBLICATIONS

U.S. Appl. No. 62/808,149, filed Feb. 20, 2019. (Year: 2019).*
DE 10065518 A1 with English translation. Filed Dec. 28, 2000. Published Jul. 11, 2002. (Year: 2002).*
DE 102015212923 A1 with English translation. filed Jul. 10, 2015. Published Jan. 12, 2017. (Year: 2017).*

* cited by examiner

LOW IMPACT DETECTION FOR AUTOMATED DRIVING VEHICLES

CROSS REFERENCES TO RELATED APPLICATIONS

This application filed under 35 U.S.C § 371 is a national phase application of International Application Serial Number PCT/IB2020/052605, filed Mar. 20, 2020, which claims the benefit of U.S. Provisional Patent Application Ser. No. 62/830,877 filed Apr. 8, 2019, the subject matter of which are incorporated herein by reference in their entirety.

BACKGROUND

Modern vehicles include various systems for helping to provide occupant safety. For example, it is known to provide a vehicle safety system that includes one or more actuatable restraints, such as airbags and seatbelts, for helping to protect an occupant of a vehicle. Vehicle safety systems utilize an airbag control unit that is operatively connected to the airbags and to a variety of crash sensors, such as accelerometers and pressure sensors. In response to determining a crash scenario based on information provided by the crash sensors, the airbag control unit is operative to deploy the airbags by activating an inflator that directs inflation fluid into the airbags. When inflated, the driver and passenger airbags help protect the occupant from impacts with parts of the vehicle such as the instrument panel and/or a steering wheel of the vehicle.

As another example, it is known to provide vehicle warning systems that alert the vehicle operator of conditions surrounding the vehicle. Vehicle warning systems include a controller that is operatively connected to various sensors, such as radar, LIDAR (high precision laser sensors), cameras, ultrasonic transducers, which provide warning indications to the operator, such as blind-spot detection, lane departure, active cruise control, front/rear object detection, cross traffic detection, pedestrian detection, active braking, etc. Some vehicle warning system functions are active. Examples include lane departure, active cruise control, and active braking. Other vehicle warning system functions are passive, producing only a visual/audible/tactile warning. Examples of these include blind-spot detection, lane departure, front/rear object detection, cross traffic detection, and pedestrian detection.

A trend in the industry toward automated driving ("AD") has introduced new considerations in the areas of vehicle safety systems and operator warning systems. In the past, the necessity of a vehicle operator/driver lent to a somewhat standard vehicle passenger cabin configuration and standard safety/warning systems. Automated driving eliminates the operator/driver, which eliminates the necessity of their being positioned and oriented in the conventional manner. Vehicle safety systems therefore need to adapt, as vehicle cabin space can be reconfigured being constrained to predetermined passenger arrangements, such as all forward-facing occupants, or vehicle structural configurations, such as steering wheel/instrument panel configurations, center console configurations, foot well pedal controls, etc.

Automated driving systems ("AD systems") need to be adapted to respond to what, in the past, were human operator responses to vehicle conditions. For example, the traditional warnings provided to the human operator by vehicle warning systems can now be inputs to the AD system, which can respond to the detected conditions as a normal course of operation.

One aspect of automated driving systems that needs to be addressed is what to do in the event of a collision and, more particularly, the actions of the AD system post-collision. In serious, medium to high impact collisions where the vehicle safety system determines the occurrence of a vehicle crash event, the AD system can control the vehicle to stop, pull-over, become disabled, etc., automatically. In these scenarios, the crash sensors of the vehicle safety system detect the occurrence of the event and responds accordingly.

There is an issue, however, with low impact collisions that are of a magnitude insufficient to trigger the vehicle safety system that a crash event has occurred. Examples of these low impact collisions include the vehicle striking other vehicles (e.g., minor collisions, such as in parking lots or driveways), pedestrians, animals, objects on the road, etc. In these instances, a human operator would stop and check on the vehicle, person, animal, or object that was hit, and also check on damage to the vehicle. In fact, it can be a criminal act for the operator for leave the scene of a collision.

Because of this, it is desirable to detect low impact events of a severity lower than the deployment/activation thresholds of the vehicle safety system. Additionally, because these low impacts can occur 360 degrees around the vehicle, it is desirable to extend this low impact detection to the area surrounding the vehicle.

SUMMARY

A method for helping to protect an occupant of a vehicle equipped with an automated driving (AD) system and a vehicle safety system (VSS) by detecting low impact crash events with the vehicle. The method includes utilizing AD sensors of the AD system to identify possible low impact collision risks. The method also includes utilizing VSS sensors of the vehicle safety system to determine a low impact collision resulting from the identified possible low impact collision.

According to one aspect, alone or in combination with any other aspect, utilizing AD sensors can include utilizing at least one of: cameras, short range radar sensors, long range radar sensors, articulating radar sensors, LIDAR laser sensors, and microphone sensors.

According to another aspect, alone or in combination with any other aspect, utilizing VSS sensors to determine a low impact collision can include utilizing at least one of accelerometers and pressure sensors.

According to another aspect, alone or in combination with any other aspect, the accelerometers can include at least one of front, rear, and side mounted mid/high range accelerometers of the VSS, and airbag controller unit (ACU) accelerometers, which are also utilized to detect the occurrence of vehicle collisions for which actuation of active and/or passive safety is warranted.

According to another aspect, alone or in combination with any other aspect, the pressure sensors can include satellite side impact pressure sensors (PSATs) and/or PPS optimized tube pressure sensors.

According to another aspect, alone or in combination with any other aspect, the method can include utilizing pedestrian protection system (PPS) optimized sensors of the vehicle safety system to determine a low impact collision resulting from the identified possible low impact collision.

According to another aspect, alone or in combination with any other aspect, the PPS optimized sensors can include PPS optimized accelerometers and/or PPS optimized pressure sensors that are optimized for detecting the occurrence of pedestrian impacts.

According to another aspect, alone or in combination with any other aspect, utilizing AD sensors can include utilizing AD cameras to identify possible low impact collision risks, and utilizing VSS sensors to determine a low impact collision can include utilizing at least one of front mid/high impact accelerometers, side mid/high impact accelerometers, ACU accelerometers, and satellite side impact pressure sensors (PSATs).

According to another aspect, alone or in combination with any other aspect, the method can include utilizing AD cameras to identify a vehicle zone for the low impact collision risk, identifying which of the front and side mid/high impact accelerometers of the VSS, ACU accelerometers, and satellite side impact pressure sensors (PSATs) are best suited to determine the occurrence of the low impact collision, and utilizing the identified accelerometer(s) and/or pressure sensor(s) to determine the low impact collision.

According to another aspect, alone or in combination with any other aspect, utilizing VSS sensors to determine a low impact collision further utilizing pedestrian protection system (PPS) accelerometers and PPS tube pressure sensors to determine the low impact collision.

According to another aspect, alone or in combination with any other aspect, the PPS accelerometers can include at least one of front, rear, and side mounted PPS accelerometers.

According to another aspect, alone or in combination with any other aspect, the PPS accelerometers can include multi-axis accelerometers, and determining a low impact collision can include determining directional information related to the low impact collision via the PPS multi-axis accelerometers.

According to another aspect, alone or in combination with any other aspect, the front and/or side mid/high impact accelerometers can include multi-axis accelerometers, and determining a low impact collision can include determining directional information related to the low impact collision via the front and/or side mid/high impact multi-axis accelerometers.

According to another aspect, alone or in combination with any other aspect, the method can include utilizing AD cameras to identify a vehicle zone for the low impact collision risk, identifying which of the front mid/high impact accelerometers, side mid/high impact accelerometers, ACU accelerometers, satellite side impact pressure sensors (PSATs), PPS accelerometers, and PPS tube pressure sensors are best suited to determine the occurrence of the low impact collision, and utilizing the identified accelerometer(s) and/or pressure sensor(s) to determine the low impact collision.

According to another aspect, alone or in combination with any other aspect, utilizing VSS sensors to determine a low impact collision further can include utilizing one or more microphone sensors to determine the low impact collision.

According to another aspect, alone or in combination with any other aspect, the method can include utilizing AD cameras to identify a vehicle zone for the low impact collision risk, identifying which of the front and side mid/high impact accelerometers of the VSS, ACU accelerometers, satellite side impact pressure sensors (PSATs), PPS accelerometers, PPS tube pressure sensors, and microphone sensors are best suited to determine the occurrence of the low impact collision, and utilizing the identified accelerometer(s) and/or pressure sensor(s) and/or microphone sensor(s) to determine the low impact collision.

According to another aspect, alone or in combination with any other aspect, utilizing VSS sensors to determine a low impact collision further can include utilizing an inertial measurement unit (IMU) sensor to determine the low impact collision.

According to another aspect, alone or in combination with any other aspect, the method can include utilizing AD cameras to identify a vehicle zone for the low impact collision risk, identifying which of the front and side mid/high impact accelerometers of the VSS, ACU accelerometers, satellite side impact pressure sensors (PSATs), PPS accelerometers, PPS tube pressure sensors, microphone sensors, and IMU sensor are best suited to determine the occurrence of the low impact collision, and utilizing the identified accelerometer(s) and/or pressure sensor(s) and/or microphone sensors, and/or IMU sensor to determine the low impact collision.

According to another aspect, alone or in combination with any other aspect, utilizing the IMU sensor can include determining an external yaw torque of the vehicle to help verify the low impact collision.

According to another aspect, alone or in combination with any other aspect, a vehicle safety system can include an airbag controller unit (ACU) configured to implement the method for helping to protect an occupant of a vehicle equipped with an automated driving (AD) system and a vehicle safety system (VSS) by detecting low impact crash events with the vehicle.

According to another aspect, alone or in combination with any other aspect, the ACU can be operatively connected to the AD sensors and the VSS sensors.

DRAWINGS

DESCRIPTION

In this description, reference is sometimes made to the left and right sides of a vehicle. These references should be understood as being taken with reference to the forward direction of vehicle travel. Thus, reference to the "left" side of a vehicle is meant to correspond to a driver side ("DS") of the vehicle. Reference to the "right" side of the vehicle is meant to correspond to a passenger side ("PS") of the vehicle.

Also, in this description, certain descriptions are made with respect to vehicle axes, specifically, the X-axis, Y-axis, and Z-axis of the vehicle. The X-axis is a central, longitudinally extending axis of the vehicle. The Y-axis is a laterally extending axis of the vehicle that is perpendicular to the X-axis. The Z-axis is a vertically extending axis of the vehicle that is perpendicular to both the X-axis and Y-axis. The X-axis, Y-axis, and Z-axis intersect at or approximate to a center of gravity ("COG") of the vehicle.

Figure 1:
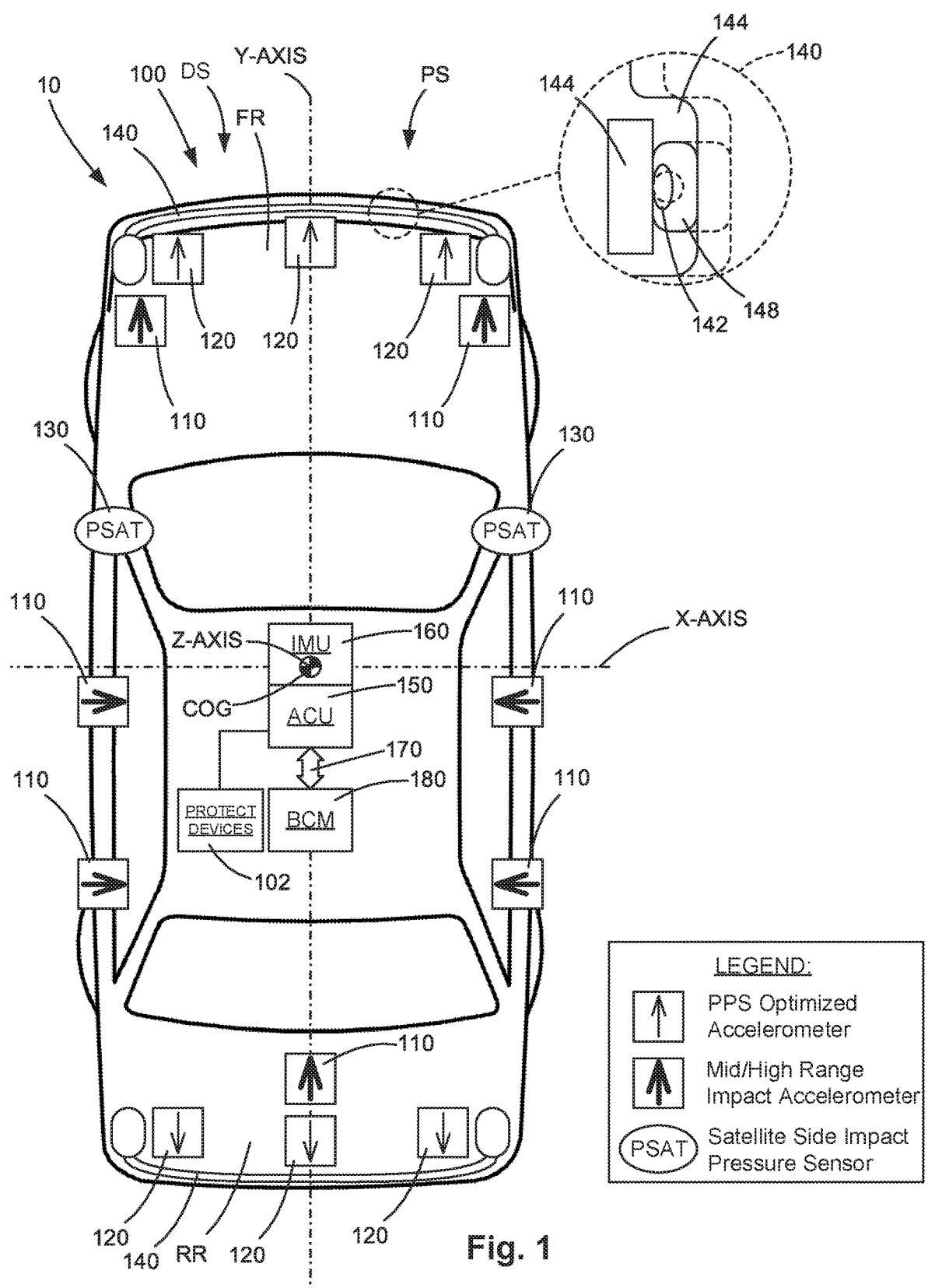
FIG. 1 is a schematic illustration of a vehicle including a vehicle safety system for determining low impacts, according to one example configuration.

Referring to FIG. 1, by way of example, a vehicle 10 includes a vehicle safety system 100. The vehicle safety system 100 includes one or more actuatable vehicle occupant protection devices, which are illustrated schematically at 102. The protection devices 102 can include any actuatable vehicle occupant protection device, such as frontal airbags, side airbags, curtain air bags, knee bolster air bags, actuatable seatbelt pre-tensioners and/or retractors. The vehicle safety system 100 also includes an airbag electronic control unit (referred to herein as an airbag controller unit or "ACU") 150 that is operatively connected to the protection devices 102. The ACU 150 is operative to control the actuation of the protection devices 102 in response to vehicle conditions sensed via one or more sensors to which the ACU is operatively connected.

The vehicle safety system 100 includes several sensors for measuring certain conditions of the vehicle 10 that are utilized to determine whether to actuate the vehicle occupant protection devices 102. These sensors, such as accelerometers and/or pressure sensors, can be mounted at various locations throughout the vehicle 10 selected to allow for sensing the particular vehicle condition for which the sensor is intended. In this description, the vehicle safety system 100 is described as including several crash sensors of different types and locations in the vehicle 10. This description is not limiting, as the vehicle safety system 100 can include any type of crash sensor, in any number, and in any location in the vehicle 10.

By way of example, the vehicle safety system 100 illustrated in FIG. 1 includes several types of crash sensors. The vehicle safety system 100 includes mid/high range crash accelerometers 110, pedestrian protection sensing ("PPS") optimized accelerometers 120, satellite side impact pressure sensors ("PSATs") 130, and PPS tube pressure sensors 140.

The crash accelerometers 110 are configured to sense vehicle accelerations of a magnitude that meets or exceeds a threshold sufficient to indicate that a crash event has taken place. In FIG. 1, the crash accelerometers 110 are single axis accelerometers configured to detect accelerations in certain directions, which are indicated generally by the arrows shown in the figure for each device. Crash sensors 110 at a front end ("FR") of the vehicle 10 measure accelerations in a forward/rearward direction parallel to the X-axis. A crash sensor 110 at a rear end ("RR") of the vehicle 10 measures accelerations in a forward/rearward direction parallel to the X-axis. Crash sensors 110 on the driver side DS and passenger side PS of the vehicle 10 measure lateral accelerations in a direction parallel to the Y-axis.

The PPS accelerometers 120 are configured to sense vehicle accelerations of a magnitude that is less than the threshold acceleration measured by the crash accelerometers 110, but that meets or exceeds a threshold less sufficient to indicate that the vehicle struck a pedestrian. In FIG. 1, the PPS accelerometers 120 are single axis accelerometers configured to detect accelerations in certain directions, which are indicated generally by the arrows shown in the figure for each device. PPS sensors 120 at the front end FR of the vehicle 10 measure accelerations in a forward/rearward direction parallel to the X-axis. PPS sensors 120 at the rear end ("RR") of the vehicle 10 measure accelerations in the forward/rearward direction parallel to the X-axis.

Satellite side impact pressure sensors PSATs 130 located on the driver side DS and passenger side PS of the vehicle 10 detect pressure responses to side impacts with the vehicle of a magnitude that meets or exceeds a threshold sufficient to indicate that a side impact crash event has taken place. The PSATs 130 have a known construction in which a closed volume is positioned in a crash zone, such as a side door, so that a side impact results in a rapid increase in fluid pressure within the volume. This pressure increase is sensed by a pressure sensor which, in response, produces a crash signal.

The PPS tube pressure sensors 140 are located in the front and rear vehicle bumpers 12 and 14, respectively. The PPS tube pressure sensors 140 detect pressure responses to front/rear impacts with the bumpers 12, 14 of a magnitude indicative of a pedestrian impact. The PPS tube pressure sensors 140 have a known construction in which a closed tube 142 is positioned between a bumper cross beam 144 and the bumper fascia 146, behind an energy absorbing foam 148. In response to a pedestrian impact with a bumper 12, 14, the fascia 146 and foam 148 move from their normal positions (indicated in dashed lines) to an impact condition (indicated in solid lines). When this occurs, the tube 142 is compressed from its normal, round cross-section (dashed lines) to a compressed condition (solid lines). This change in shape results in a rapid increase in fluid pressure within the tube 142. This pressure increase is sensed by a pressure sensor which, in response, produces a crash signal.

The crash sensors, i.e., the crash accelerometers 110, PPS accelerometers 120, PSATs 130, and PPS tube pressure sensors 140, are operatively connected to the ACU 150. The ACU 150 is operative to actuate the vehicle occupant protection devices 102 in a known manner in response to crash signals generated by the crash sensors.

The vehicle safety system 100 also includes an inertial measurement unit (IMU) 160, which is mounted at or near the vehicle center of gravity (COG) and operatively connected to the ACU 150. The IMU sensor 160 includes inertial measurement sensors and, possibly, crash sensors for detecting the occurrence of a vehicle crash condition. Positioning the IMU sensor 160 at the vehicle COG is beneficial in that the sensor can provide accurate readings of sensed accelerations and roll motions of the vehicle 10 about the X-axis (pitch), Y-axis (roll), and Z-axis (yaw). Since crash indication can be best determined by measuring accelerations at or near the vehicle COG, and vehicle rotation indications are best measured about the vehicle X, Y, and Z axes, the COG mounting location of the IMU 160 can be advantageous.

The vehicle safety system 100 is implemented and configured to cooperate with other vehicle systems. The ACU 150 can be operatively connected, via a vehicle controller area network (CAN) bus 170, to a vehicle body control module (BCM) 180. The BCM 180 can communicate via the CAN bus with other vehicle systems, such as chassis control, stability control, traction/skid control, anti-lock braking (ABS), collision avoidance, tire pressure monitoring (TPMS), navigation systems, instrumentation (speed, throttle position, brake pedal position, etc.), information and entertainment ("infotainment") systems, and other systems. Through the CAN bus 170 interface, the ACU 150 can communicate with any of these external systems to provide and/or receive data.

FIG. 1 represents what are considered to be conventional vehicle safety system components. The various sensors illustrated in FIG. 1, while not necessarily included on any vehicle platform are nonetheless considered to be technologies that are currently available. Not every passenger vehicle will include a vehicle safety system that includes all of these sensors, but most, if not all passenger vehicles, will include some combination of these sensors. The vehicle safety system 100 of FIG. 1 therefore represents the type of system in which a low impact detection system can be implemented without adding system hardware.

Figure 2:
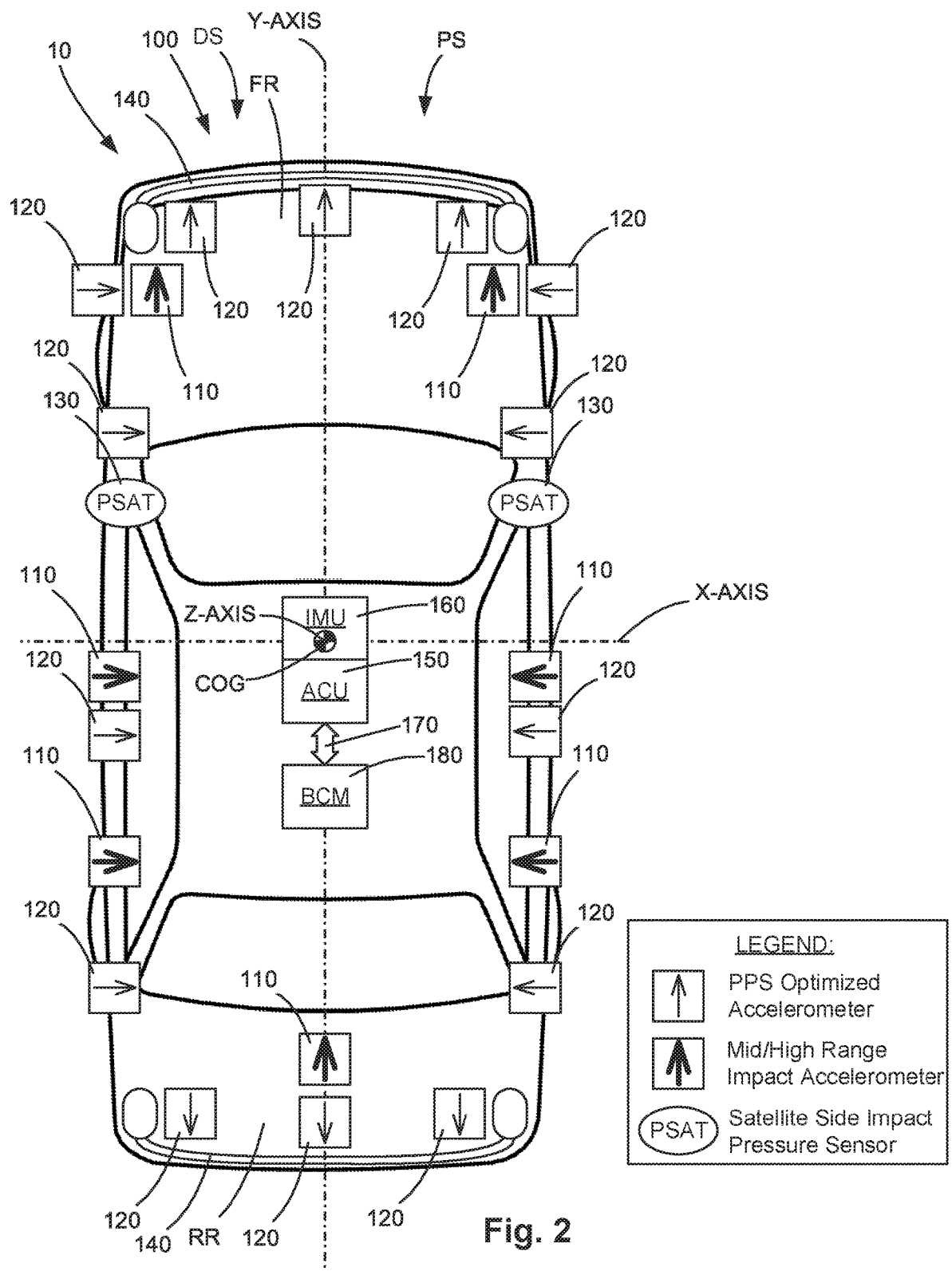
FIG. 2 is a schematic illustration of a vehicle including a vehicle safety system for determining low impacts, according to another example configuration.

FIG. 2 represents an example configuration of a vehicle safety system 100 that includes additional hardware, i.e., sensors, directed toward providing enhanced low impact detection functionality. As shown in FIG. 2, the vehicle safety system 100 includes additional PPS optimized accelerometers 120 located along the driver and passenger sides of the vehicle 10. The number and arrangement of additional PPS optimized accelerometers 120 included in this low impact detection enhanced vehicle safety system 100 can vary depending, for example, on the size of the vehicle 10, the vehicle architecture, and the range of the sensors, etc.

Figure 3:
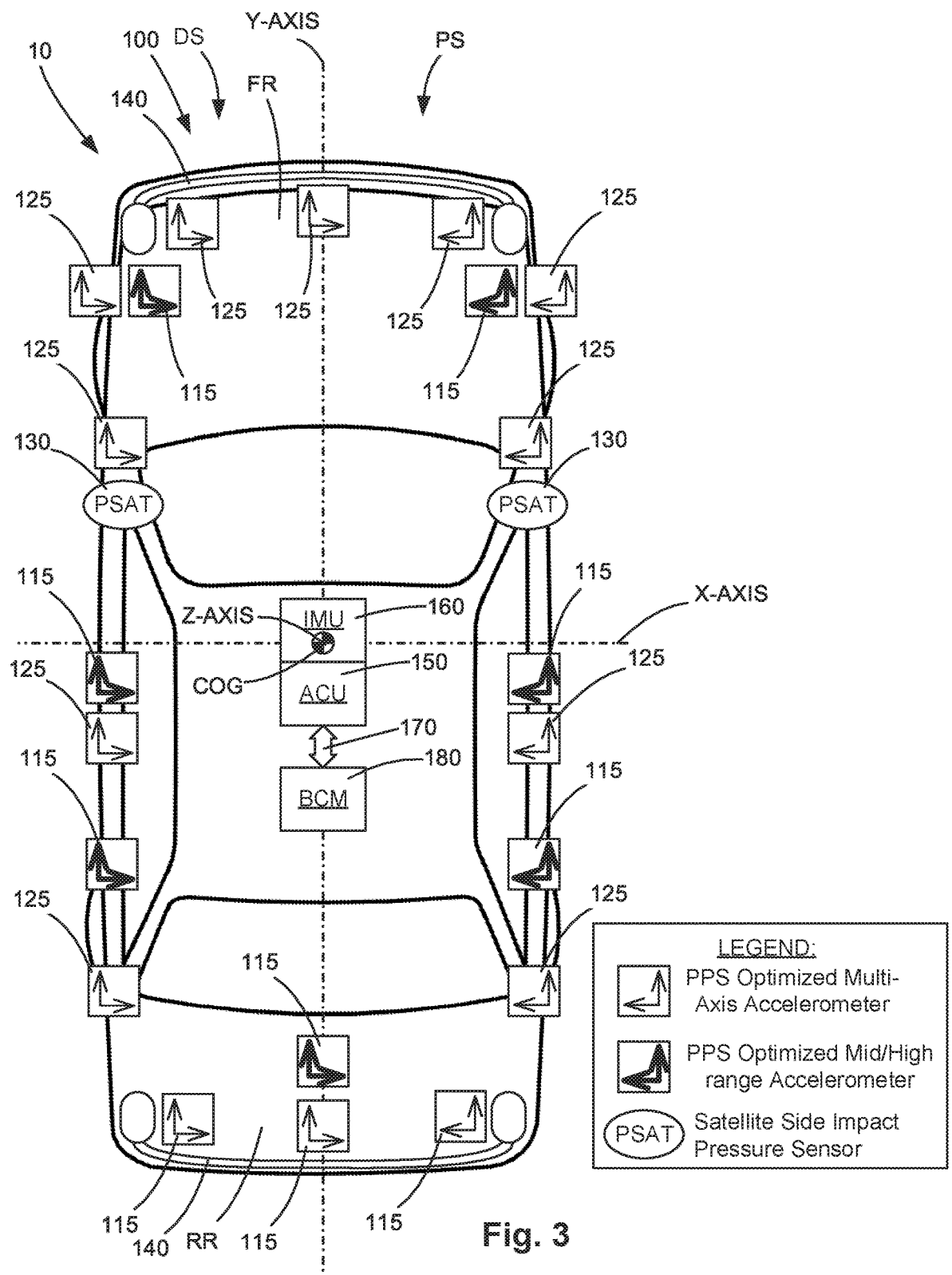
FIG. 3 is a schematic illustration of a vehicle including a vehicle safety system for determining low impacts, according to another example configuration.

FIG. 3 represents another example configuration of a vehicle safety system 100 that includes additional hardware, i.e., sensors, directed toward providing enhanced low impact detection functionality. As shown in FIG. 3, the vehicle safety system 100 includes multi-axis accelerometers as opposed to single-axis accelerometers. More specifically, the vehicle safety system 100 includes PPS optimized multi-axis mid/high range impact accelerometers 115 and multi-axis PPS optimized accelerometers 125. The PPS optimized multi-axis accelerometers 125 are located about the perimeter of the vehicle 10, i.e., along the front, rear, and sides of the vehicle. The multi-axis accelerometers measure accelerations along both the X-axis and the Y-axis directions and therefore can interpolate to determine the direction of impacts. As with the other example configurations, the number and arrangement of the multi-axis accelerometers 115, 125 can vary depending, for example, on the size of the vehicle 10, the vehicle architecture, and the range of the sensors, etc.

Figure 4:
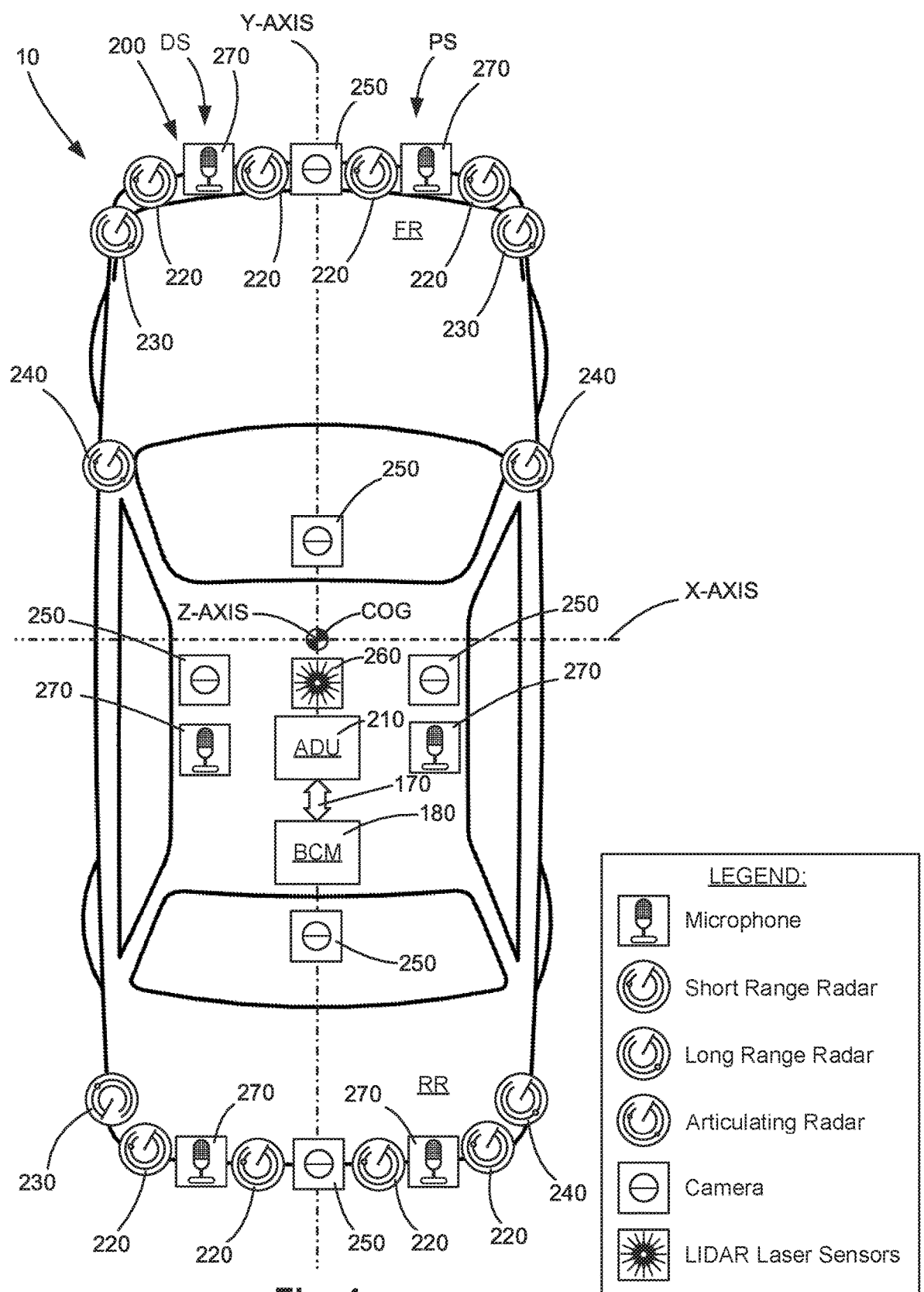
FIG. 4 is a schematic illustration of a vehicle including a vehicle safety system for determining low impacts, according to another example configuration.

Referring to FIG. 4, the vehicle 10 also an automated driving system 200. The automated driving system 200 includes an automated driving controller or unit ("ADU") 210 that is operative to control driving operation of the vehicle 10 in response to information received from automated driving sensors, which provide data related to the operating environment of the vehicle.

The automated driving sensors use a variety of different technologies to evaluate the environment in which the vehicle 10 is operating. The automated driving sensors are be mounted at various locations throughout the vehicle 10. The automated driving sensors and their respective locations are selected to provide 360-degree coverage of the vehicle operating environment. In this description, the automated driving system 200 is described as including several crash sensors of different types and locations in the vehicle 10. This description is not limiting, as the automated driving system 200 can include any type of crash sensor, in any number, and in any location in the vehicle 10.

By way of example, the automated driving system 200 illustrated in FIG. 4 includes several types of automated driving sensors. The automated driving system 200 includes short range radar sensors 220, long range radar sensors 230, articulating radar sensors 240, cameras sensors 250, and laser ("LIDAR") sensors 260. The short range radar sensors 220 detect objects in close proximity to the vehicle. The long range radar sensors 230 detect more distant objects, such as other vehicles in traffic and also measure velocities. The articulating radar sensors 240 detect moving vehicles at long range over a wide field of view. The camera sensors 250 detect and track pedestrians, cyclists, traffic lights, free space, and other objects. The LIDAR sensors 260 are high-precision laser sensors that detect both fixed and moving objects.

In the example configuration illustrated in FIG. 4, the short range radars 220 are located across the front end of the vehicle 10 and across the rear end of the vehicle. The limited range of the short range radars 220 is used to provide indications and warnings as vehicles and other objects come into close proximity to the vehicle. The short range radars 220 can, for example, provide rear backup and front parking indications and warnings.

In the example configuration illustrated in FIG. 4, the long range radars 230 are located at the front and rear ends of the vehicle 10. The extended range of the long range radars allows them to provide indications and warnings regarding vehicles and other objects further away from the vehicle. For example, the front positioned long range radars 230 can be used for adaptive cruise control and also to determine relative velocities between the vehicle and other vehicles and/or objects for risk identification and for evasive systems such as automatic braking. The rear positioned long range radars 240 can provide rear risk identification, such as cross traffic and blind spot detection.

In the example configuration illustrated in FIG. 4, the articulated radars 240 are located on the sides of the vehicle 10. The articulated radars 240 can provide both close and long range vehicle/object detection. The articulated radars 240 can be for risk identification such as cross traffic and blind spot detection.

As shown in FIG. 4, the automated driving system 200 can be implemented and configured to cooperate with other vehicle systems via the CAN bus 170. The ADU 210, for example, communicate with the BCM 180 via the CAN bus 170, and any of the other vehicle systems connected to the CAN bus, to provide and/or receive data. The information obtained by the various systems, e.g., the vehicle safety system 100, the automated driving system 200 and the vehicle systems that interface with the BCM 180, can be communicated to each other. Additionally, the various sensors utilized by the ADU 210 can themselves have their own dedicated electronic controller unit ("ECU"). For example, the cameras 250, the radars 220, 230, 240, the LIDAR 260, and the microphone sensors 270 each can have their own dedicated ECU, which powers and interrogates the sensors, interprets data received from the sensors, and transmits that data to the ADU 210.

In operation, the automated driving system 200 operates the vehicle in a known manner. During automated vehicle operation, the ADU 200 actively collects information environmental data from the from the automated driving sensors and uses that information to execute vehicle driving commands. At the same time, the vehicle safety system 100 operates passively, monitoring conditions sensed via the crash sensors (e.g., acceleration, pressure) for conditions indicative of a crash and providing a crash signal when such an event takes place.

The above description of the example configuration of the automated driving system 200 of FIG. 4 represents what are considered to be conventional automated driving system components. The various sensors illustrated in FIG. 4 described thus far, while not necessarily included on any automated driving vehicle platform, are nonetheless considered to be technologies that are currently available. Not every automated driving vehicle will include all of these sensors, but most, if not all, automated driving vehicles will include some combination of these sensors. The automated driving system 200 of FIG. 4 described thus far therefore represents the type of system in which a low impact detection system can be implemented without adding system hardware.

FIG. 4 also includes additional hardware, i.e., sensors, directed toward providing enhanced low impact detection functionality. As shown in FIG. 4, the automated driving 200 includes auditory, i.e., microphone sensors 270 that can be used to further discriminate a low impact vehicle collision. The microphone sensors 270 can be included in the automated driving system 200 because they can enhance the risk identification evaluation functions that are implemented in the automated driving function of the system. The microphone sensors 270 can, for example, be used to detect emergency vehicle sirens, vehicle horns, tire screech, etc.

In the example configuration of FIG. 4, the microphone sensors 270 are located across the front end of the vehicle 10, across the rear end of the vehicle, and along the sides of the vehicle. Additional microphone sensors 270 could be included at other locations on the vehicle 10. The number and arrangement of microphone sensors 270 included in this low impact detection enhanced automated driving system 200 can vary depending, for example, on the size of the vehicle 10, the vehicle architecture, and the range of the sensors, etc.

Advantageously, information developed by the vehicle safety system 100 and the automated driving system 200 can be used to implement a system for detecting low impacts with the vehicle. "Low impacts," as used herein, are meant to refer to collisions or impacts that are low-level, of a magnitude insufficient to trigger the crash sensors and for the vehicle safety system 100 to identify a vehicle crash condition. Examples of these low impact events include the vehicle striking other vehicles (e.g., minor collisions in parking lots, etc.), pedestrians, animals, objects on the road, etc. Low impact detection can allow the automated driving system 200 to take the appropriate action in response to the low impact event.

Figure 5:
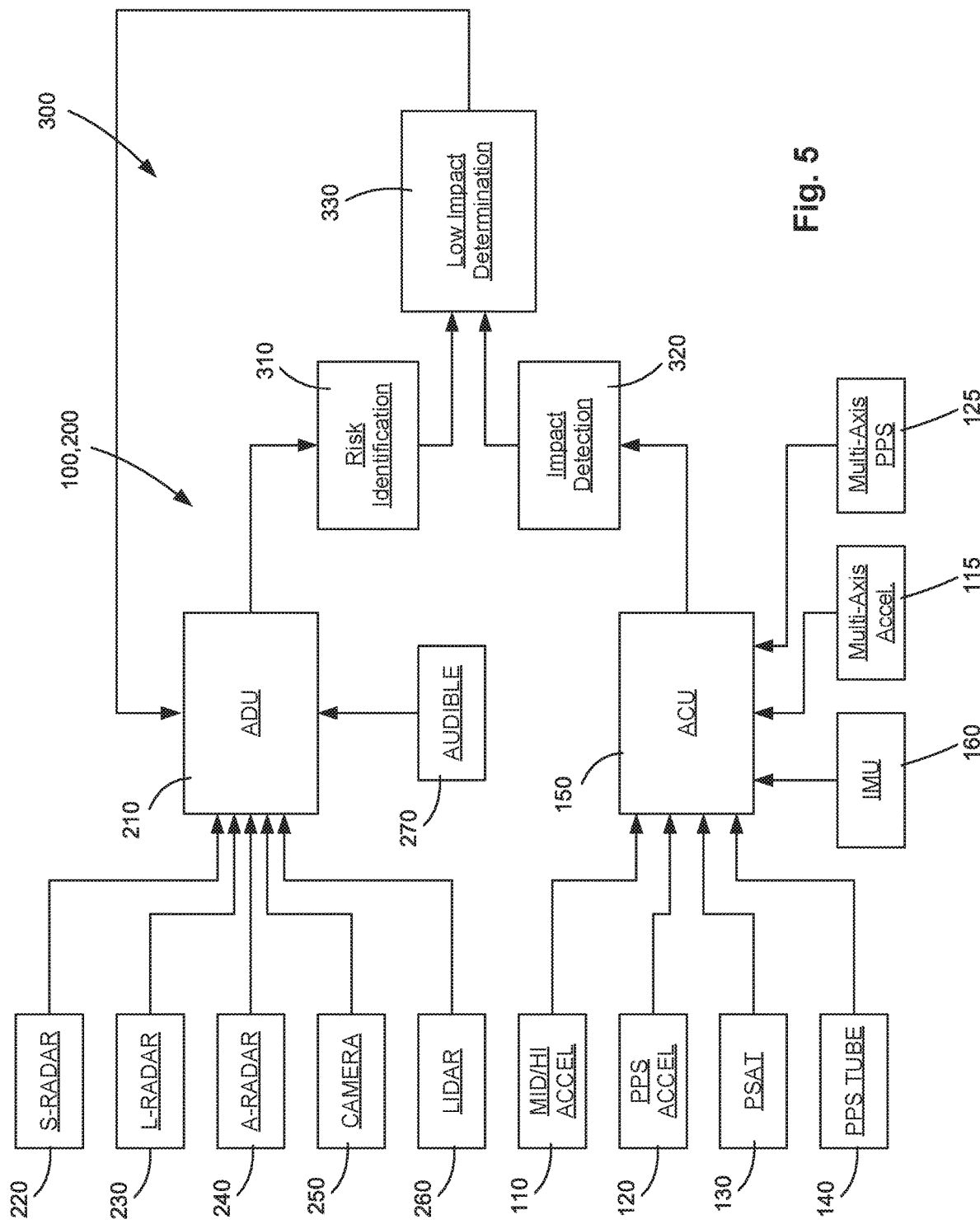
FIG. 5 is a schematic diagram illustrating the various vehicle safety systems of FIGS. 1-4.

Referring to FIG. 5, a low impact detection system 300 utilizes information provided by the vehicle safety system 100 and the automated driving system 200. The low impact detection system 300 includes a ADS-based risk identification function 310 and a VSS-based impact detection function 320. The low impact detection system 300 also includes a low impact determination function 330, which utilizes data obtained from the risk identification function 310 and the impact detection function 320 to determine whether a low impact collision has occurred. The automated driving system 200 can obtain low impact collision data from the low impact determination function 330 so that the automated driving system can react accordingly.

The risk identification function 310, impact detection function 320, and low impact determination function 330 of the low impact detection system 300 include software algorithms that can be implemented in a variety of manners. In one implementation, risk identification and low impact determination functions 310, 330 can be implemented in the ADU 210 of the automated driving system 200. In this example, the impact detection function 320 can be implemented in the ACU 160 of the vehicle safety system 100. As another example, the low impact detection system 300 could be implemented in the automated driving system 200 only. As a further example, the low impact detection system 300, or portions thereof, could be implemented in its own dedicated controller. From this, it should be appreciated that the low impact detection system can be implemented in any vehicle system or systems that can access the vehicle information necessary to make the low impact determinations described herein.

The risk identification function 310 identifies risk based on information obtained via the radar sensors 220, 230, 240, the camera 250 and the LIDAR 260. As shown in FIG. 5, the risk identification function 310 can also be enhanced by data provided from the audible, microphone sensors 270.

The impact detection function 320 detects impacts based on information obtained via the medium/high range impact accelerometers 110, the PPS optimized accelerometers 120, the PSAT satellite side impact pressure sensors 130, and the PPS tube pressure sensors 140. As shown in FIG. 5, the impact detection determination of the vehicle safety system 100 can also be enhanced by data provided from the additional PPS optimized accelerometers 110, the PPS optimized multi-axis mid/high range impact accelerometers 115, and the PPS optimized multi-axis accelerometers 125.

The hardware utilized by the various functions of the low impact detection system 300 depends upon the type of implementation of the system. The type of implementation depends on whether or not the low impact detection system 300 includes low impact detection specific sensor hardware, as opposed to including only conventional sensor hardware. Example implementations of the low impact detection system 300 are described in the following paragraphs.

Baseline Implementation

In a baseline implementation, the low impact detection system 300 can be configured to utilize information available from the conventional vehicle safety system 100 and automated driving system 200, to provide limited low impact detection capabilities. In this example implementation, the vehicle safety system 100 can include the front and side mid/high impact accelerometers 110 (see, FIG. 1), the ACU 160, and the PSAT sensors 130. The impact detection function 320 can obtain data sensed via these VSS sensors from the ACU 150. The automated driving system 200 can include one or more cameras 250 for risk identification. The risk identification function 310 can obtain data sensed via the camera(s) from the ADU 210.

For this example implementation, noting that the vehicle safety system 100 does not include any PPS optimized inputs, the low impact determination function 330 relies on automated driving system 200 functionality to identify risks, and then monitors the VSS crash sensors to determine whether the detected risk evolved into a low impact collision. Because the crash sensors of the conventional vehicle safety system 100 are not specifically configured to detect impact accelerations and/or pressure changes indicative of a low impact, the low impact determination function 330 can implement an algorithm that conditions the data determined by the impact detection function 320 based on the data determined by the risk identification function. This way, the magnitude of the acceleration determined by the impact detection function 320 necessary to verify a low impact collision is based on the type of risk determined by the risk identification function 310.

PPS Enabled Implementation

A PPS enabled implementation of the low impact detection system 300 builds on the baseline implementation. In addition to the information utilized by the baseline implementation, in the PPS enabled implementation, the impact detection function 320 can additionally utilize information available from pedestrian protection sensing (PPS) portions of the vehicle safety system 100 to detect low impact collisions. The PPS enabled implementation utilizes the PPS accelerometers 120 and/or PPS tube pressure sensors 140 to extend PPS detection to the front and rear of the vehicle 10. Providing this information to the impact detection function 320 improves the fidelity with which low impacts with the vehicle 10 are detected.

For this PPS enhanced implementation, the low impact determination function 330 can rely on automated driving system 200 functionality to identify risks, and then monitor the VSS crash sensors, including the PPS sensors, to determine whether the detected risk evolved into a low impact collision. Because the PPS sensors are specifically configured to detect impact accelerations and/or pressure changes indicative of a low impact, e.g., a pedestrian impact, the algorithm implemented by the low impact determination function 330 may not require conditioning for verifying low impact collisions where the identified risk is a front/rear risk because the PPS sensors are specifically configured to verify these types of collisions. For low impact side collisions, the low impact detection system 300 relies on the baseline functionality, as described above, wherein the magnitude of the acceleration determined by the impact detection function 320 necessary to verify a low impact collision is based on the type of risk determined by the risk identification function 310.

Enhanced PPS Implementation

In an enhanced PPS implementation of the low impact detection system 300, in addition to the conventional crash sensors 110, 130, 160 and the front/rear PPS sensors 120, 140, the low impact determination function 330 can additionally utilize information available from additional PPS sensors. Referring to FIG. 2, the vehicle 10 can include driver side and passenger side mounted PPS accelerometers 110 to provide additional low impact detection capabilities. In this example implementation, the risks detected via the automated driving system 200 can be verified as actual impacts via the PPS accelerometers 110. The low impact determination function 330 can therefore provide positive verification that the detected risk has actually evolved into a low impact event, which is a further improvement in the fidelity of the low impact determination system 300.

Enhanced Crash and PPS Implementation

In an enhanced crash and PPS implementation of the low impact detection system 300, the vehicle safety system 100 can utilize enhanced crash and PPS sensors. Referring to FIG. 3, the vehicle safety system 100, including the multi-axis mid/high range impact accelerometers 115 and the multi-axis PPS enhanced accelerometers 125, can offer improved impact discrimination information. As a result, the vehicle safety system 100 can discern the difference between a mid/high range collision and a low impact collision. The VSS 100 can also discern directional information from the multi-axis sensors 115, 125, which can improve both the crash verification and crash magnitude determination capabilities of the low impact detection system 300. As a result, in this example implementation, the risks detected via the automated driving system 200 can be verified as actual low impacts via the discrimination functionality of the multi-axis accelerometers 115, 125. The low impact determination function 330 can therefore provide positive verification that the detected risk has actually evolved into a low impact event, which is a further improvement in the fidelity of the low impact determination system 300.

Microphone Enhanced Implementation

In another example implementation of the low impact determination system 300, information obtained from the microphone sensors 270 of the automated driving system 200 can be utilized to help verify the occurrence of a low impact collision. Referring to FIG. 4, the microphone sensors 270 can provide further verification that the risks detected via the automated driving system 200 have evolved to actual low impact collisions. In an implementation where microphone sensors 270 are positioned along the front, rear, and sides of the vehicle, the microphone sensors 270 used to verify the low impact collision can be those closest to the area where the risk is identified by the ADS 200. The low impact determination function 310 can therefore provide positive verification that the detected risk has actually evolved into a low impact event, which is a further improvement in the fidelity of the low impact determination system 300.

IMU Enhanced Implementation

In another example implementation of the low impact determination system 300, information obtained from the IMU 160 can be used to determine external yaw torque, which can be used to help verify that the risks detected via the automated driving system 200 have evolved to actual low impact collisions.

In the implementations of the low impact determination system 300 described above, the automated driving system 200 is described as relying on information obtained via cameras 250 to identify the risks, which are verified by the impact detection algorithm 320 with crash data obtained from the VSS 100. The automated driving system 200 could, however, utilize information obtained from other sensors of the ADS 200 when available. For example, the ADS 200 could utilize, in any combination, information obtained from the radar sensors 220, 230, 240, the camera(s) 250, the LIDAR sensors 260.

Utilizing the ADS sensors, risk identification function the identified risk can be categorized as being located in a certain zones of the vehicle, e.g., front, rear, left, right, left-front, right-front, left-rear, right-rear, left-mid, right-mid, etc. In doing so, the zone identification can be used to pre-condition the impact detection function 320 so that it looks for impact indication from the VSS accelerometers in that particular zone.

We claim:

1. A method for helping to protect an occupant of a vehicle equipped with an automated driving (AD) system that operates the vehicle without an operator/driver, and a vehicle safety system (VSS) including one or more protection devices by detecting low impact crash events with the vehicle, the method comprising:
   identifying possible low impact collision risks using AD sensors of the AD system;
   determining a low impact collision resulting from the identified possible low impact collision using VSS sensors of the vehicle safety system; and
   controlling the AD system to operate the vehicle in response to determining the low impact collision.

2. The method recited in claim 1, wherein identifying possible low impact collision risks using AD sensors comprises utilizing at least one of: cameras, short range radar sensors, long range radar sensors, articulating radar sensors, LIDAR laser sensors, and microphone sensors.

3. The method recited in claim 1, wherein determining a low impact collision resulting from the identified possible low impact collision using VSS sensors to determine a low impact collision comprises utilizing at least one of accelerometers and pressure sensors.

4. The method recited in claim 3, wherein the accelerometers comprise at least one of front, rear, and side mounted mid/high range accelerometers of the VSS, and airbag controller unit (ACU) accelerometers, the method further comprising detecting the occurrence of vehicle collisions for which actuation of active and/or passive safety is warranted using the at least one of front, rear, and side mounted mid/high range accelerometers of the VSS, and airbag controller unit (ACU) accelerometers.

5. The method recited in claim 3, wherein the pressure sensors comprise satellite side impact pressure sensors (PSATs) and/or pedestrian protection system (PPS) optimized tube pressure sensors.

6. The method recited in claim 1, further comprising determining a low impact collision resulting from the identified possible low impact collision using pedestrian protection system (PPS) optimized sensors of the vehicle safety system.

7. The method recited in claim 6, wherein the PPS optimized sensors comprise PPS optimized accelerometers and/or PPS optimized pressure sensors that are optimized for detecting the occurrence of pedestrian impacts.

8. The method recited in claim 1, wherein identifying possible low impact collision risks using AD sensors comprises identifying possible low impact collision risks using AD cameras, and determining a low impact collision using VSS sensors comprises determining a low impact collision using at least one of front mid/high impact accelerometers, side mid/high impact accelerometers, ACU accelerometers, and satellite side impact pressure sensors (PSATs).

9. The method recited in claim 8, wherein determining a low impact collision using VSS sensors further comprises determining the low impact collision using pedestrian protection system (PPS) accelerometers and PPS tube pressure sensors.

10. The method recited in claim 9, wherein the PPS accelerometers comprise at least one of front, rear, and side mounted PPS accelerometers.

11. The method recited in claim 9, wherein the PPS accelerometers comprise multi-axis accelerometers, and determining a low impact collision comprises determining directional information related to the low impact collision via the PPS multi-axis accelerometers.

12. The method recited in claim 9, wherein the front and/or side mid/high impact accelerometers comprise multi-axis accelerometers, and determining a low impact collision comprises determining directional information related to the low impact collision via the front and/or side mid/high impact multi-axis accelerometers.

13. The method recited in claim 9, wherein determining a low impact collision using VSS sensors further comprises determining the low impact collision using one or more microphone sensors.

14. The method recited in claim 13, further comprising identifying a vehicle zone for the low impact collision risk using AD cameras, identifying which of the front and side mid/high impact accelerometers of the VSS, ACU accelerometers, satellite side impact pressure sensors (PSATs), PPS accelerometers, PPS tube pressure sensors, and microphone sensors are best suited to determine the occurrence of the low impact collision, and determining the low impact collision using the identified accelerometer(s) and/or pressure sensor(s) and/or microphone sensor(s).

15. The method recited in claim 13, wherein determining a low impact collision using VSS sensors further comprises determining the low impact collision using an inertial measurement unit (IMU) sensor.

16. The method recited in claim 15, further comprising identifying a vehicle zone for the low impact collision risk using AD cameras, identifying which of the front and side mid/high impact accelerometers of the VSS, ACU accelerometers, satellite side impact pressure sensors (PSATs), PPS accelerometers, PPS tube pressure sensors, microphone sensors, and IMU sensor are best suited to determine the occurrence of the low impact collision, and determining the low impact collision using the identified accelerometer(s) and/or pressure sensor(s) and/or microphone sensors, and/or IMU sensor.

17. The method recited in claim 16, wherein using the IMU sensor comprises determining an external yaw torque of the vehicle to help verify the low impact collision.

18. A method for helping to protect an occupant of a vehicle equipped with an automated driving (AD) system that operates the vehicle without an operator/driver, and a vehicle safety system (VSS) including one or more protection devices by detecting low impact crash events with the vehicle, the method comprising:
    identifying possible low impact collision risks using AD sensors of the AD system;
    determining a low impact collision resulting from the identified possible low impact collision using VSS sensors of the vehicle safety system; and
    controlling the AD system to operate the vehicle in response to determining the low impact collision,
    wherein identifying possible low impact collision risks using AD sensors comprises identifying possible low impact collision risks using AD cameras, and determining a low impact collision using VSS sensors comprises determining a low impact collision using at least one of front mid/high impact accelerometers, side mid/high impact accelerometers, ACU accelerometers, and satellite side impact pressure sensors (PSATs),
    wherein the method further comprises identifying a vehicle zone for the low impact collision risk using AD cameras, identifying which of the front and side mid/high impact accelerometers of the VSS, ACU accelerometers, and satellite side impact pressure sensors (PSATs) are best suited to determine the occurrence of the low impact collision, and determining the low impact collision using the identified accelerometer(s) and/or pressure sensor(s).

19. A method for helping to protect an occupant of a vehicle equipped with an automated driving (AD) system that operates the vehicle without an operator/driver, and a vehicle safety system (VSS) including one or more protection devices by detecting low impact crash events with the vehicle, the method comprising:
    identifying possible low impact collision risks using AD sensors of the AD system;
    determining a low impact collision resulting from the identified possible low impact collision using VSS sensors of the vehicle safety system; and
    controlling the AD system to operate the vehicle in response to determining the low impact collision,
    wherein identifying possible low impact collision risks using AD sensors comprises identifying possible low impact collision risks using AD cameras, and determining a low impact collision using VSS sensors comprises determining a low impact collision using at least one of front mid/high impact accelerometers, side mid/high impact accelerometers, ACU accelerometers, and satellite side impact pressure sensors (PSATs),
    wherein determining a low impact collision using VSS sensors further comprises determining the low impact collision using pedestrian protection system (PPS) accelerometers and PPS tube pressure sensors,
    and wherein the method further comprises identifying a vehicle zone for the low impact collision risk using AD cameras, identifying which of the front mid/high impact accelerometers, side mid/high impact accelerometers, ACU accelerometers, satellite side impact pressure sensors (PSATs), PPS accelerometers, and PPS tube pressure sensors are best suited to determine the occurrence of the low impact collision, and determining the low impact collision using the identified accelerometer(s) and/or pressure sensor(s).

20. A vehicle safety system (VSS) for a vehicle equipped with an automated driving (AD) system that operates the vehicle without an operator/driver, the VSS comprising one or more protection devices and an airbag controller unit (ACU), the ACU being configured to:
  identify possible low impact collision risks using AD sensors of the AD system;
  determine a low impact collision resulting from the identified possible low impact collision using VSS sensors of the vehicle safety system; and
  control the AD system to operate the vehicle in response to determining the low impact collision.

21. The vehicle safety system of claim 20, wherein the ACU is operatively connected to the AD sensors and the VSS sensors.

* * * * *